Dec. 15, 1964  B. H. REFSON  3,161,141
ROTARY PUMPS
Filed May 20, 1963
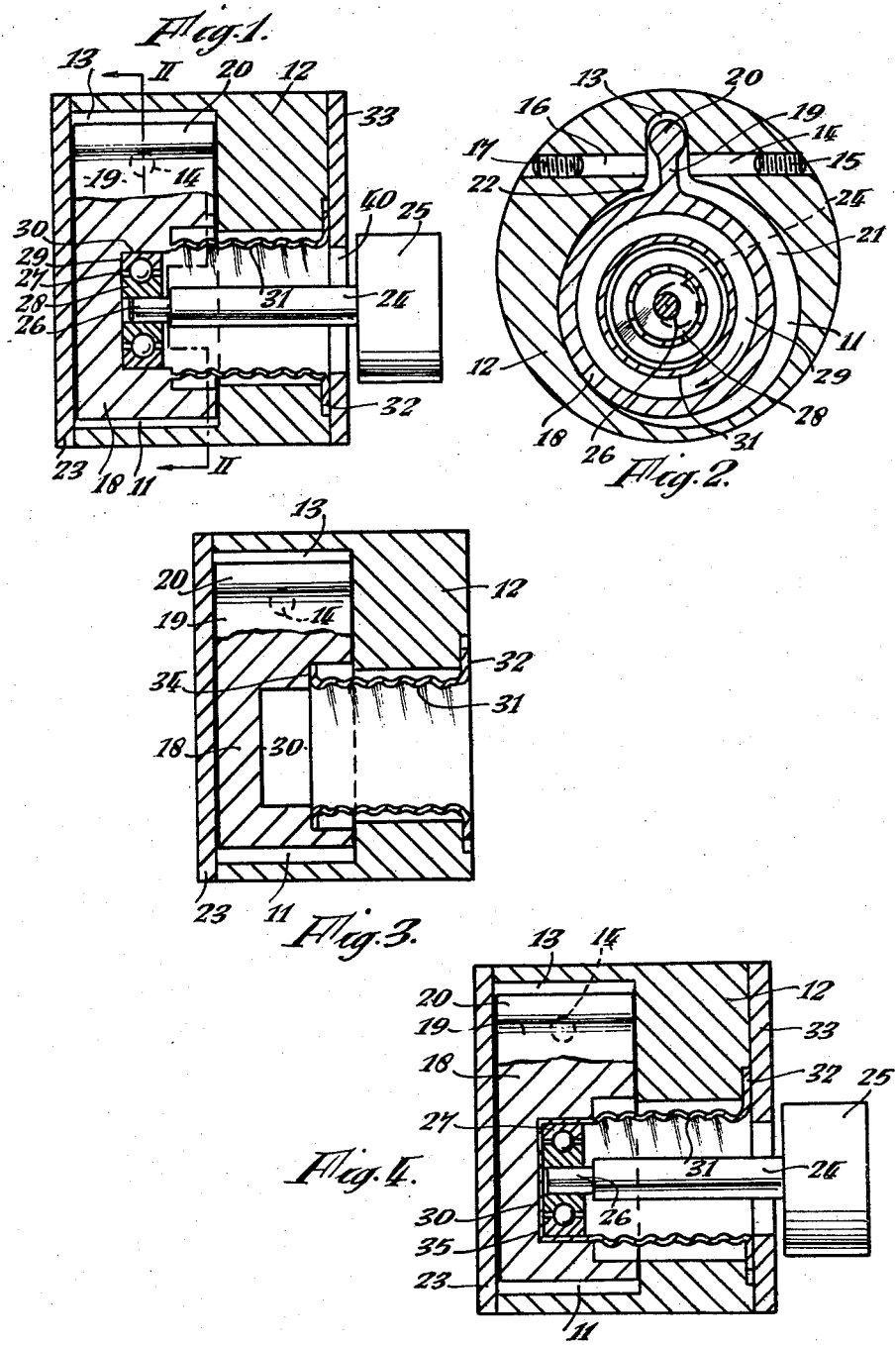

United States Patent Office 3,161,141
Patented Dec. 15, 1964

3,161,141
ROTARY PUMPS
Bernard Henry Refson, "The Tangle," Ibstone,
High Wycombe, England
Filed May 20, 1963, Ser. No. 281,631
2 Claims. (Cl. 103—132)

This invention relates to rotary pumps of the gyratory piston type, in which a piston which is substantially smaller than the pump chamber gyrates around the axis of the pump chamber and has a vane or other projection which engages in a recess in the wall of the pump chamber so as, together with the piston, to separate the pump chamber into inlet and outlet compartments which communicate by means of inlet and outlet ports with conduits or the like associated with a source of and destination for a fluid. The gyration or orbital movement of the piston in the pump chamber operates to increase and decrease the said inlet and outlet compartments alternately whereby to draw fluid into the pump chamber through the inlet port and expel it therefrom through the outlet port.

The gyration of the piston is effected by an eccentric driven by a rotary shaft. The eccentric may preferably consist of a pin eccentrically mounted on the rotary shaft, which pin engages a bearing mounted in said piston. The engagement of the piston vane or projection in the recess in the wall of the pump chamber provides a fixed abutment to prevent rotation of the piston around its own axis, but allows oscillation of the piston on said axis through a small angle.

In order to prevent leakage of the fluid from the pump chamber without providing elaborate seals around the driving shaft where it enters the casing of the pump chamber a cylindrical sealing sleeve of a flexible and resilient material is provided which sleeve surrounds a part of the driving shaft and bearing and is disposed in sealing-tight association with the pump casing and the piston to isolate the driving shaft and bearing from the pump chamber.

The object of the present invention is to provide improvements in a rotary pump of the kind referred to.

According to this invention, a rotary pump of the kind referred to is characterised in that the said vane is enlarged at its outer edge to form a bulbous tip of substantially cylindrical section which fits with a close sliding fit in the said recess in the pump chamber wall, and the said piston, vane and bulbous tip are formed integrally with each other from a resilient and flexible material.

Embodiments of the invention are shown in the accompanying drawings, wherein:

FIG. 1 is a longitudinal sectional elevation of one embodiment;

FIG. 2 is a transverse section taken on line II—II of FIG. 1;

FIG. 3 is a longitudinal sectional elevation showing a modification of the embodiment shown in FIG. 1; and FIG. 4 is a longitudinal sectional elevation of another embodiment of the invention.

Referring to FIGS. 1 and 2, a pump chamber 11 is formed within a casing 12 provided with a cover plate 23. The chamber 11 is substantially cylindrical and a recess 13 in the casing extends from the said chamber. A fluid inlet duct 14 extends from one wall of the recess 13 to the external surface of the casing where the duct is adapted, by screw threads 15 or other means, for a fluid supply conduit to be attached thereto. Similarly, a fluid outlet duct 16 extends from the opposite wall of the recess 13 and is adapted, as at 17, for a fluid conduit to be attached thereto.

A substantially cylindrical piston 18 is disposed within the pump chamber 11 and has a projecting vane 19 which extends into the recess 13, the outer edge or tip 20 of the vane being bulbous of substantially cylindrical section so as to fit closely within the recess and slide therein in a reciprocating manner, the directions of said reciprocation being substantially radially of the cylindrical pump chamber 11. The piston 18 has an external diameter which is substantially less than the diameter of the chamber 11 so that the piston, together with the vane 19, forms within the pump chamber 11 and the recess 13 the inlet and outlet compartments 21 and 22 which, respectively, communicate with the inlet and outlet ducts 14 and 16. The axial length of the piston 18 and of its vane 19 is just sufficiently smaller than the axial length of the chamber 11 to allow the piston 18 and the vane 19 to move in the chamber 11 and in the recess 13, with the piston 18 and the bulbous tip 20 of the vane 19 in sliding contact therewith, without allowing appreciable leakage of fluid between the compartments 21 and 22.

The piston 18, the vane 19 and the bulbous tip 20 are formed integrally with each other from a resilient and flexible material, which may be a natural rubber or a synthetic plastic material, the material being determined by the nature of the fluid which is to be pumped.

A rotary drive shaft 24, driven in any suitable manner, for example by a pulley 25 from a suitable drive source, for example a motor, is co-axial with the chamber 11 and is provided with an eccentric pin 26 mounted in a bearing 27. The bearing 27 preferably, as shown, is a ball-bearing of which the inner race 28 is rigid with the pin 26 and the outer race 29 is a tight fit within an axial recess 30 in the piston 18. The eccentric pin 26 is co-axial with the piston 18. Alternatively, the bearing 27 may be a plain bearing, and in that case the bearing is a tight fit within the piston axial blind recess 30 and the pin 26 rotates in the bearing.

Around the axial recess 30 the piston 18 is extended to form a flexible sheath 31 which is integral with the piston. The sheath 31 may be corrugated for at least part of its length to form substantially a bellows, and the outer end of the sheath is flanged outwardly at 32 which flange is secured rigidly to and in fluid-tight contact with the outer end wall surface of the casing 12 either by being welded thereto and/or clamped thereto by an end plate 33, or by being secured by studs and interposed sealing rings. When the end plate 33 is provided, the drive shaft 24 passes freely through an orifice 40 therein. The cover 23, and the end plate 33 when provided, are secured to the casing 12 by bolts or other means not shown.

The drive shaft 24 is disposed within the sheath 31 and is rotatable therein.

It will be seen that when the drive shaft 24 is rotated the piston 18 will gyrate or orbit within the chamber 11 to cause fluid to flow from the inlet duct 14 to the outlet duct 16 and out of said duct 16 under pressure. The vane 19 with its bulbous tip 20 will reciprocate in the recess 13 and will act as a divider to separate the duct 14 and the chamber compartment 21 from the duct 16 and the chamber compartment 22, the bulbous tip 20 sliding in fluid-tight contact on the walls of the recess 13, and the vane 19 flexing to allow the piston 18 to gyrate or orbit in the chamber 11. Thus, lateral movement of the piston 18 in the chamber 11 is absorbed by the elasticity of the material from which the piston 18 and the vane 19 are formed integrally with each other, and the line contacts of the integral bulbous tip 20 with the walls of the recess 13 provide the minimum sealing and friction surfaces.

The fluid-tight connection of the outer end 32 of the sheath 31 with the casing 12 will prevent any fluid leaking out of the casing, whilst the sheath 31, being flexible, will allow the piston 18 to gyrate or orbit in the chamber 11.

In a modified embodiment, shown in FIG. 3, the sheath 31 is separate from the piston 18 and the inner end of the sheath is flanged outwardly at 34, the said flange being secured rigidly and in fluid-tight manner by welding or other suitable means to the piston 18. Otherwise, this embodiment is the same as that shown in FIGS. 1 and 2.

A further embodiment of the invention is shown in FIG. 4, wherein the sheath 31 is extended at its inner end and closed to form a cap 35 which fits tightly into the recess 30 in the piston, and the outer race 29 of the bearing 27 fits tightly inside the said cap, the result being that the piston 18, the end cap 35 of the sheath 31, and the outer race 29 of the bearing are rigid with each other.

In all cases the sheath is made of material which is impermeable to the fluid which is to be moved by the pump. The sheath 31 can be made of the same material as the piston 18, and will be so formed in the embodiment shown in FIGS. 1 and 2.

The pump has the advantage that the pump chamber can be sealed in liquid-tight manner from the outside without the use of rotary seals or gland packings.

What I claim and desire to secure by Letters Patent is:

1. A rotary pump of the gyratory piston type, having an abutment affixed to the piston to prevent rotation thereof, comprising a pump casing, a substantially cylindrical pump chamber formed within said casing and having a recess extending radially outwardly from said chamber into said casing, a fluid inlet duct communicating with said chamber on one side of said recess, a fluid outlet duct communicating with said chamber on the other side of said recess, a substantially cylindrical piston disposed within said pump chamber, said piston having a vane affixed thereto, said vane extending the length of said piston and projecting radially from the surface thereof into said recess, the edge of said vane being bulbous and fitting within said recess in a sliding fit, said piston and vane being formed integrally from resilient and flexible material, said piston having a blind cylindrical axially extending recess formed therein, a bearing mounted in said recess in said piston, a drive shaft extending into said casing, a pin eccentrically mounted on said shaft and drivingly engaging said bearing in said piston, a flexible tubular sheath of impermeable material integrally formed with said piston with one end of said sheath positioned around the location of said recess in said piston, said tubular sheath extending over said drive shaft and having at the other end thereof a radially extending flange sealedly secured to said pump casing around the periphery of said flange to isolate said drive shaft and bearing from said chamber, the radius of said piston being less than the radius of said pump chamber by approximately the eccentric distance of said pin whereby rotation of said drive shaft will cause gyration of said piston without rotation thereof within said chamber and pumping of fluid from said inlet to said outlet duct with said vane sliding within said recess in sealed engagement therewith.

2. A rotary pump of the gyratory piston type, having an abutment affixed to the piston to prevent rotation thereof, comprising a pump casing, a substantially cylindrical pump chamber formed within said casing and having a recess extending radially outwardly from said chamber into said casing, a fluid inlet duct communicating with said chamber on one side of said recess, a fluid outlet duct communicating with said chamber on the other side of said recess, a substantially cylindrical piston disposed within said pump chamber, said piston having a vane affixed thereto, said vane extending the length of said piston and projecting radially from the surface thereof into said recess, the edge of said vane being bulbous and fitting within said recess in a sliding fit, said piston and vane being formed integrally from resilient and flexible material, said piston being provided with an axially extending cylindrical recess therein, a flexible tubular sheath of impermeable material, said sheath being closed at one end and inserted within said recess of said piston, a bearing being mounted in said piston by fitting said bearing within said closed end of said sheath, a drive shaft extending into said casing, a pin eccentrically mounted on said shaft and drivingly engaging said bearing in said piston, said tubular sheath extending over said drive shaft and having at the open end thereof a radially extending flange sealedly secured to said pump casing around the periphery of said flange to isolate said drive shaft and bearing from said chamber, the radius of said piston being less than the radius of said pump chamber by the eccentric distance of said pin whereby rotation of said drive shaft will cause gyration of said piston without rotation thereof within said chamber and pumping of fluid from said inlet to said outlet duct with said vane sliding within said recess in sealed engagement therewith.

References Cited in the file of this patent

UNITED STATES PATENTS

| Re. 23,992 | Cornelius | May 3, 1955 |
| 229,592 | Drawbaugh | July 6, 1880 |
| 2,133,358 | McCormack | Oct. 18, 1938 |
| 2,212,939 | Irgens | Aug. 27, 1940 |
| 2,237,075 | Kemper | Apr. 1, 1941 |
| 2,246,487 | Fraser | June 17, 1941 |
| 2,584,865 | Gordinier | Feb. 5, 1952 |
| 2,841,089 | Jones | July 1, 1958 |
| 3,025,801 | Paikert | Mar. 20, 1962 |

FOREIGN PATENTS

| 1,251,315 | France | Dec. 12, 1960 |
| 133,074 | Germany | Aug. 27, 1902 |
| 647,172 | Germany | June 29, 1937 |
| 829,554 | Germany | Jan. 28, 1952 |